United States Patent
Harvey et al.

(10) Patent No.: US 9,935,919 B2
(45) Date of Patent: Apr. 3, 2018

(54) DIRECTORY PARTITIONED SYSTEM AND METHOD

(75) Inventors: Richard H. Harvey, Victoria (AU); Justin J. McDonald, Tasmania (AU); Ronald W. Ramsay, Victoria (AU)

(73) Assignee: CA, Inc., New York, NY (US)

( * ) Notice: Subject to any disclaimer, the term of this patent is extended or adjusted under 35 U.S.C. 154(b) by 1774 days.

(21) Appl. No.: 12/351,300

(22) Filed: Jan. 9, 2009

(65) Prior Publication Data

US 2009/0216723 A1 Aug. 27, 2009

Related U.S. Application Data

(60) Provisional application No. 61/031,246, filed on Feb. 25, 2008.

(51) Int. Cl.
*G06F 7/00* (2006.01)
*H04L 29/12* (2006.01)

(52) U.S. Cl.
CPC .... *H04L 61/1576* (2013.01); *H04L 29/12169* (2013.01); *H04L 61/1523* (2013.01)

(58) Field of Classification Search
CPC . G06F 12/1408; G06F 17/30486; G06F 9/465
USPC ......... 707/736–738, 758
See application file for complete search history.

(56) References Cited

U.S. PATENT DOCUMENTS 5,717,919 A * 2/1998 Kodavalla et al.
6,173,313 B1 * 1/2001 Klots et al. ........... 709/203
7,093,092 B2 * 8/2006 Stojancic ............... 711/164
7,181,017 B1 * 2/2007 Nagel et al. ........... 380/282
7,308,643 B1 * 12/2007 Zhu et al. ............... 715/206
7,756,919 B1 * 7/2010 Dean et al. ............. 709/201
8,136,025 B1 * 3/2012 Zhu et al. ............... 715/200
2002/0120697 A1 * 8/2002 Generous et al. ...... 709/206
2002/0152293 A1 * 10/2002 Hahn et al. ............ 709/223
2003/0058923 A1 * 3/2003 Chen et al. ............ 375/133
2004/0109365 A1 * 6/2004 Stojancic ............... 365/200

(Continued)

OTHER PUBLICATIONS

Kumar, Apurva, "Filter Based Directory Replication: Algorithms and Performance," IBM India Research Lab, http://www.cecs.uci.edu/~papers/icdcs05/56_kumara_directory.pdf, 12 pages, Jun. 10, 2005.

(Continued)

*Primary Examiner* — Tony Mahmoudi
*Assistant Examiner* — Linh Black
(74) *Attorney, Agent, or Firm* — Baker Botts L.L.P.

(57) ABSTRACT

This disclosure relates in general to the field of directory information systems and/or services. In a method embodiment, a method of arranging objects in a directory information system includes providing a plurality of objects to a computer-readable medium having a directory information structure. Each object may have one or more characteristics and each object may be stored, for example, in the computer-readable medium according to the directory information structure. Storing the objects may further include performing a mathematic operation on at least one of the characteristic(s) of the object, and arranging the object in the directory information structure based at least in part on a result of the mathematical operation performed on at least one of the characteristic(s) of the object.

16 Claims, 2 Drawing Sheets

(56) References Cited

U.S. PATENT DOCUMENTS

| | | | |
|---|---|---|---|
| 2004/0236860 A1* | 11/2004 | Logston et al. | 709/230 |
| 2005/0044197 A1* | 2/2005 | Lai | 709/223 |
| 2005/0262343 A1* | 11/2005 | Jorgensen et al. | 713/168 |
| 2007/0038705 A1* | 2/2007 | Chickering et al. | 709/206 |
| 2007/0156842 A1* | 7/2007 | Vermeulen et al. | 709/217 |
| 2009/0006156 A1* | 1/2009 | Hunt et al. | 705/7 |
| 2009/0144346 A1* | 6/2009 | Duffy et al. | 707/205 |
| 2010/0031021 A1* | 2/2010 | Arnold et al. | 713/155 |

OTHER PUBLICATIONS

Harvey et al., "A Directory System and Method of Searching Information," U.S. Appl. No. 12/331,610, filed Dec. 10, 2008, 39 pages, drawings—1 page (9092), Dec. 10, 2008.

Harvey et al., "Directory and Methods of Use," U.S. Appl. No. 12/331,616, filed Dec. 10, 2008, 29 pages, drawings—2 pages (9093), Dec. 10, 2008.

* cited by examiner

DIRECTORY PARTITIONED SYSTEM AND METHOD

RELATED APPLICATION

This application claims benefit under 35 U.S.C. § 119(e) of U.S. Provisional Application Ser. No. 61/031246, entitled "A DIRECTORY PARTITIONED SYSTEM AND METHOD" filed Feb. 25, 2008, by Richard H. Harvey et al.

TECHNICAL FIELD

This disclosure relates in general to the field of directory information systems and/or services, and more particularly to a method, system, and apparatus that provides a partitioned directory.

BACKGROUND

In conventional directory systems, one way of representing computer-readable data is in a hierarchical tree-like structure, commonly referred to as a Directory Information Tree (DIT). Some conventional DIT structures are limited for a variety of reasons. For example, some conventional larger DIT structures have limitations related to convenience because these larger DIT structures have certain technological constraints, such as the implementation of Lightweight Directory Access Protocol (LDAP). The LDAP is a relatively simple client-to-server protocol with no provision for distributed operations. In addition, some conventional implementations can operate to collect similar entries into a single "bucket" (e.g., dropping subscriber entries under a node called "subscribers").

Other conventional DIT structures have limitations related to hosting. For example, in most cases, these conventional larger DIT structures tend to have single large buckets of information that reside on only a single machine or server. This can result in a reduction in performance and can limit the scalability of the DIT structure. In some conventional DIT structures this practice can be limited by the constraints on memory and processing, the cost of the machine, and replication and data management requirements often of gigabytes of information. Still other conventional DIT structures have limitations related to naming. In some cases, these conventional DIT structures attempt to distribute large flat DIT structures, which typically require one or more extra levels of nodes. Each of these extra nodes requires an additional name in the DIT structure. This practice is cumbersome and difficult to restructure, manage and expand because the management of the extra nodes is typically hard-coded into every application. That is, the distribution is being explicitly managed by the directory clients and not implicitly by the directory servers.

Another approach to representing computer-readable data is to use a proxy where the proxy caches search results and/or attributes as an index into other servers looking after sets of entries. This also has many limitations, such as the size of the index server, the single point of failure, start-up time, difficulty in keeping the index server up-to-date etc.

SUMMARY

In a method embodiment, a method of arranging objects in a directory information system includes providing a plurality of objects to a computer-readable medium having a directory information structure. Each object may have one or more characteristics and each object may be stored, for example, in the computer-readable medium according to the directory information structure. Storing the objects may further include performing a mathematic operation on at least one of the characteristic(s) of the object, and arranging the object in the directory information structure based at least in part on a result of the mathematical operation performed on at least one of the characteristic(s) of the object.

In another embodiment, a directory information system includes one or more servers and a plurality of objects stored in computer-readable medium of a directory information system comprising a plurality of partitions. Each partition may be managed by at least one of the one or more servers. In addition, each partition may be subordinate to a first parent node of one or more parent nodes. In some embodiments, each object may be arranged in a respective partition of the plurality of partitions in accordance with a respective result of a mathematical operation applied to one or more characteristics of the object.

Numerous technical advantages are provided according to various embodiments of the present disclosure. Particular embodiments of the disclosure may exhibit none, some, or all of the following advantages depending on the implementation. For example, some embodiments may use an algorithmic approach to manage data navigation in a manner that is invisible to the user. Various embodiments may make use of X.500 distribution and replication. Processing and I/O may be distributed over many machines, thereby optimizing speed and memory usage. In some embodiments, the use of multiple smaller machines may reduce total system cost as compared to using one larger machine. Backup and recovery may be faster in some embodiments that perform operations in parallel using partitioned machines; and information that is cached for each partition can be loaded in parallel, allowing for accelerated availability. Various embodiments may not affect applications or the general operation of a backbone of directories (e.g., load-sharing, replication, failover, fail-back, etc.).

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION

The present disclosure relates in general to the field of directory information systems and/or services (e.g., The Domain Name System (DNS)), and more particularly to a method, system, and apparatus that provides a partitioned directory. The present disclosure also relates to a method of arranging, storing, transfer and backup of data associated with a directory system and/or a directory service. In some embodiments, a directory system and/or service may enable the look up of a name and information associated with that name. Some such names may be associated with multiple and/or different pieces of information; and some such names may have many different types of data. Various directory systems and/or services may include software encoded in computer-readable medium that may be operable, when executed by one or more processors, to store, organize and/or provide access to information in a directory. Some embodiments may use standardized directory server technologies, such as, for example, Lightweight Directory Access Protocol (LDAP), X.500 and/or Directory Service Markup Language (DSML); however, any technology or standard, including future technologies or standards, may be used without departing from the scope of the present disclosure.

Particular embodiments of the present disclosure may use directory distributed operations over a set of partitioned objects, such as, for example, chaining and multi-chaining as described in the X.500 standards. In some cases, the objects may be partitioned using an algorithmic approach that can be based, for example, on one or more of the various object names. Such an algorithm may also be used, for example, to efficiently chain a particular operation. The example embodiments of the present disclosure are best understood by referring to FIGS. 1 through 3, like numerals being used for like and corresponding parts of the various drawings.

Figure 1:
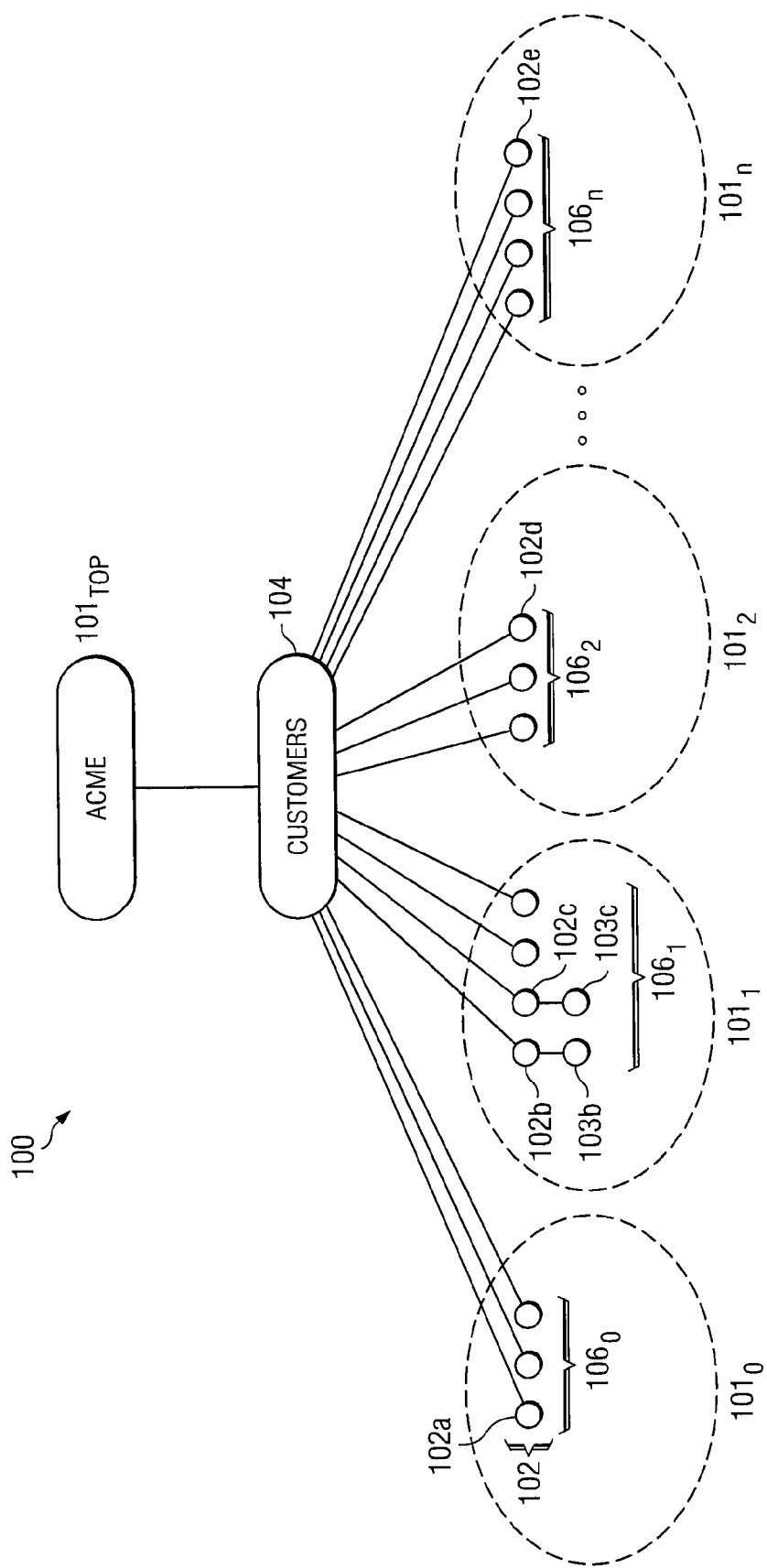
FIG. 1 is a block diagram illustrating a portion of a system having multiple objects partitioned under a common parent node according to one embodiment.

FIG. 1 is one embodiment of a block diagram illustrating a portion of a system 100 having multiple objects 102 partitioned under a common parent node 104. In this particular embodiment, each of objects 102 generally refers to an entry, such as data and/or logic, embodied within computer-readable medium of system 100. The illustrated example includes at least four object partitions $106_{0-n}$. Although this embodiment includes four partitions 106, any other number of partitions may be included without departing from the scope of the present disclosure. In this embodiment, each partition 106 includes one or more objects 102; and each object 102 may include one or more subordinate objects 103. In this example, objects 103b and 103c are subordinate to objects 102b and 102c, respectively. In some embodiments, subordinate objects 103b and 103c may have one or more of their own subordinate objects (not explicitly shown). In this example, the one or more subordinate objects 103 are maintained in a hierarchical arrangement.

Each object partition 106 may be managed, for example, by a respective Directory System Agent (DSA) $101_{TOP-n}$. In various embodiments, each DSA 101 can be hosted, for example, on respective servers (not explicitly shown); however, any suitable configuration and apparatus may be used. For example, a server can host one or more DSAs 101 and a DSA 101 can manage one or more partitions 106. In addition, each DSA 101 may include all or a portion of a directory server, client server, file server, domain name server, proxy server, web server, application server, computer, handheld device, bridge, router, bridge-router, switch, node, or other communication device, including future communication devices. One or more parent nodes 104 may be managed, for example, by one or more respective top-level DSA $101_{TOP}$; however, any suitable hierarchy configuration may be used.

In this example, the illustrated object partitions 106 are all arranged under the same parent node 104. Although this example shows a single parent node 104, any additional number of parent nodes 104 can be used without departing from the scope of the present disclosure. In other embodiments, one or more of the DSAs $101_{0-n}$ can be arranged under parent node 104, while others of DSA $101_{0-n}$ can be arranged under one or more other parent nodes 104 (not explicitly shown). Parent node 104 generally refers to any distributed directory node that may be used to manage objects 102 and/or subordinate objects 103. In this example, parent node 104 operates to manage data pertaining to a particular customer base; however, the data may pertain to any suitable information.

In this example, DSA $101_{TOP}$ generally refers to any apparatus capable of managing objects 102 and/or subordinate objects 103 that are partitioned under a parent node 104. For example, DSA $101_{TOP}$ may include all or a portion of a file server, domain name server, proxy server, web server, application server, computer, handheld device, bridge, router, bridge-router (router), switch, node, some other communication device, any combination of the preceding, or one or more other apparatus capable of managing objects 102 and/or subordinate objects 103 that are partitioned under a parent node 104. In particular embodiments, DSA $101_{TOP}$ may be hosted on an apparatus that also hosts one or more of the illustrated DSAs $101_{0-n}$. Although in this example DSA $101_{TOP}$ generally manages data pertaining to an entity named ACME, DSA $101_{TOP}$ may manage any data, which may pertain to any suitable information, entity, or entities, without departing from the scope of the present disclosure.

The various nodes of system 100 may be logically described and referenced in any of a variety of ways. In this example, the parent node 104 is named as follows:

<o Acme><ou Customers>.

The labeled objects 102a, 102b, 102c and 102d may be named, respectively, using a "guid" attribute substantially similar to the following:

<o Acme><ou Customers><guid 0>,
<o Acme><ou Customers><guid 1>,
<o Acme><ou Customers><guid 2>,
<o Acme><ou Customers><guid 3>,
etc.

In particular embodiments, the configuration of each partition$_{0-n}$, may involve defining their context prefix (base name), such that each contains at least one of the following: a leaf node attribute; a hashing algorithm; a number of partitions; and a unique number "N" in the range from 0 to one less than the "number of partitions." For example, if N=3, and the hashing algorithm is "hash1," then the prefixes of DSA $101_{TOP}$, DSA $101_0$, DSA $101_1$, DSA $101_2$, and DSA $101_n$ may be configured, respectively, substantially similar to the following:

<o Acme>
< o Acme ><ou Customers ><guid "[hash1(4)=0]">,
< o Acme ><ou Customers ><guid "[hash1(4)=1]">,
< o Acme ><ou Customers ><guid "[hash1(4)=2]">, and
< o Acme ><ou Customers ><guid "[hash1(4)=3]">.

In this example, navigation to an object 102 in one of the partitions$_{0-n}$ involves calculating a hash of one or more of the objects 102. When any DSA 101 receives a request it communicates or chains the request to a corresponding partition 106. The partition 106 may be determined, for example, by hashing the value of the "guid" from the entry's base object, modulus the "number of partitions." In some embodiments, each DSA 101 may be operable to calculate a hash of one or more of the objects 102-103. For example, in some cases DSA $101_{TOP}$ can perform the determination of the appropriate partition 106. In other cases, any of DSA $101_{0-n}$ can determine the appropriate partition 106. In some embodiments, the determination can be performed by the following function call:

$$\text{function(characteristic) mod N=result} \quad \text{(equation 1)}$$

where "function" is a mathematical operation producing a positive integer outcome, "characteristic" is based on one or more attributes of the object, "N" is the number of partitions 106 arranging objects 102-103, and "result" indicates which partition 106 should contain, or does in fact contain, the entry.

In another example, "hash1" is an ASCII sum. An add request of entry "<o Acme><ou Customers><guid mcdju01>" may thus involve summing the ASCII values of "mcdju01" (e.g., 628 mod 3=1). The request is communicated or chained accordingly. For example, the request may be chained to one of the DSAs 101 having a name corresponding to the summed ASCII values, such as, for example, DSA $101_1$. Although DSA $101_1$ is used in this example, any other DSA 101, including, for example, DSA $101_{TOP}$, may be used without departing from the scope of the present disclosure.

Although a "hash1" algorithm is used in this example, any other hashing algorithm, such as a linear or non-linear algorithm, may be used without departing from the scope of the present disclosure. For example, in particular embodiments the hashes may include one or more of the following in any suitable combination: numeric sums (e.g., ASCII sum of uppercase characters from value); checksums (e.g., CRC-16, CR-32, etc.); cryptographic hashes (e.g., SHA-1 MD5); hash tables; etc. Some hashes may include one or more linear algorithms that distribute objects 102-103 evenly among partitions 106. In addition, some hashes may be computationally inexpensive. For example, some hashes may involve minimal processing. In some embodiments, the same hash function may be used for the configuration of all sibling directory servers DSA $101_{0-n}$. Additional detail regarding steps that may be performed by system 100 is described further with reference to FIGS. 2 and 3.

Figure 2:
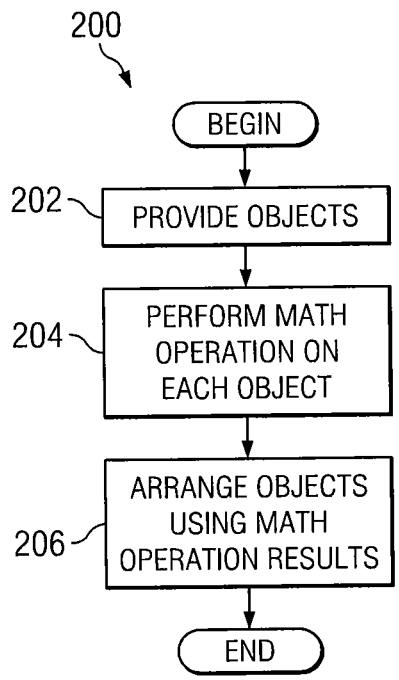
FIG. 2 is a flowchart illustrating example steps concerning arranging objects that may be used by the directory system of FIG. 1 according to one embodiment.

FIG. 2 is one example embodiment of a flowchart 200 illustrating example steps concerning arranging objects that may be used by the directory system 100 of FIG. 1. In this example the steps involve implementing an algorithmic approach to that arranges objects within multiple partitions of directory system 100. In particular embodiments, the steps of flowchart 200 may be effected, at least in part, through the execution of logic embodied within a computer-readable medium.

In the illustrated embodiment, the process begins by providing multiple objects to system 100 at step 202. In some embodiments, providing multiple objects to system 100 can include, for example, receiving, determining, uploading, downloading, reading, or otherwise considering a plurality of objects. In this example, the objects provided in step 202 can be substantially similar in structure and function to objects 102 and 103 of FIG. 1.

In step 204, a mathematic operation is performed on a respective characteristic of the objects provided in step 202. For example, a mathematical operation may be performed on a numeric conversion of a name, email address, and/or some other unique or non-unique identifier of each object. The mathematical operation may include, for example, a hash function substantially similar to those described above with reference to FIG. 1. In some such embodiments, the hash function may include one or more subroutines that may involve, for example, one or more checksums, cryptographic hashes, numeric sums (e.g., an ASCII sum), or hash tables.

Each object is arranged in a directory system, in step 206, in accordance with a result of the mathematical operation performed on one or more characteristics of the object in step 204. For example, the various objects may be distributed among a plurality of partitions substantially similar to partitions $106_{0-n}$ described above with reference to FIG. 1. Each partition may be associated, for example, with a particular result, or a particular range of results, produced by the mathematical operations performed in step 204. In some such embodiments, the partitions may be managed, for example, by one or more servers of directory system 100.

In this particular example, the objects are arranged in step 206 in a suitable hierarchy. For example, some objects may have one or more levels of subordinate objects. In addition, at least some of the objects may be distributed among multiple partitions sharing a common parent node. Some such partitions may be referred to as "related" partitions. The objects arranged according to these various examples described herein with reference to FIG. 2 may be accessed in any of a variety of ways. One example is described further below with reference to FIG. 3.

Figure 3:
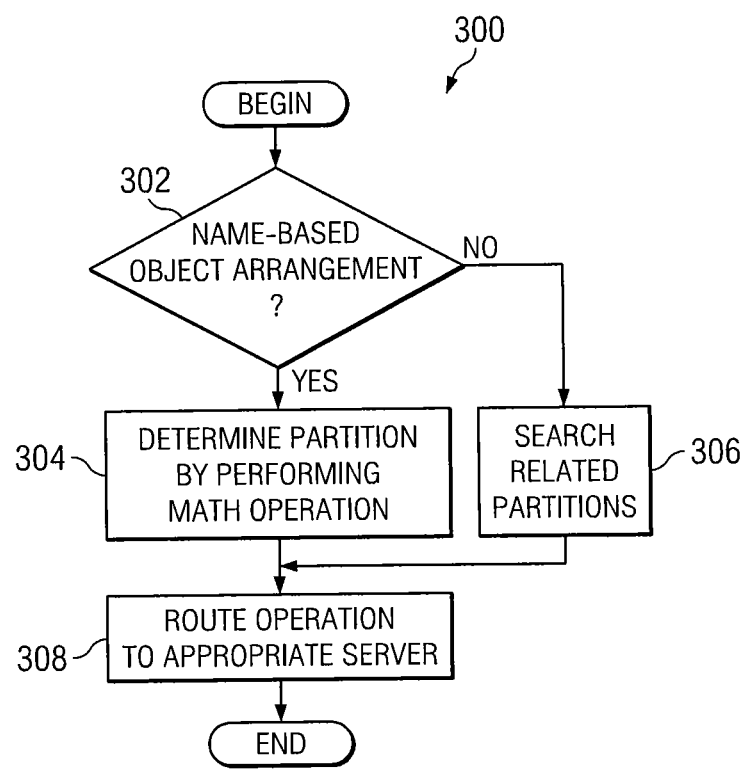
FIG. 3 is a flowchart illustrating example steps concerning object navigating that may be used by the directory system of FIG. 1 according to one embodiment.

FIG. 3 is one example embodiment of a flowchart 300 illustrating example steps concerning object navigating that may be used by the directory system 100 of FIG. 1. Navigating to any given base object may be effected in any of a variety of ways. This particular example implements an algorithmic or a sibling approach to route operations within a directory system. Although this particular example implements an algorithmic or sibling approach to route operates, any other suitable approach may be implemented without departing from the scope of the present disclosure. In particular embodiments, the steps of flowchart 300 may be implemented, at least in part, through the execution of logic embodied within a computer-readable medium.

In the illustrated embodiment, the process begins by determining whether an operation is associated with an object that is arranged in a directory system according to a characteristic of the object (e.g., a name) at step 302. For example, in some embodiments, at least some of the objects in a directory system may be partitioned using one or more algorithms substantially similar to those described above with reference to FIGS. 1 and 2. In this example, a particular partition corresponding to the target object may be determined, in step 304, by applying the same or a similar algorithm to a characteristic of the directory operation (e.g., an identification of the object).

If the operation, however, is associated with an object that is arranged in the directory system based on attributes other than name, then the target object may be determined, in step 306, by searching at least some of the partitions sharing a parent node, such as parent node 104 of FIG. 1, identified in the operation. For example, if a particular partition is encountered during such a disturbed search, then the related partitions sharing the same parent node may be determined and searched until the target object is found.

Regardless of how the appropriate partition is determined (e.g., whether through example step 304, example step 306, a combination of both steps 304 and 306, or some other step), the operation is routed in step 308. For example, the operation may be routed to a server managing the partition holding the target object.

One advantage of leveraging normal directory distribution and replication is the use of normal load sharing and replication. That is, each partitioned server may have a mirrored server that is defined using the same or substantially similar rules. In this manner, any load-sharing or replication operation can route or copy information in a manner that is the same or substantially similar to a non-partitioned, mirrored server.

Another advantage of using an algorithmic approach in combination with directory distribution is that there may be no need to maintain a cache of indexes or search results to find which partition an object resides.

Yet another advantage is that partitioning is invisible to the client directory applications. This means that these applications can also use large large, flat DITs; and a directory administrator can freely partition this namespace across as many servers and computers as desired. Further, if the large, flat namespace continues to grow, the directory administrator can increase the number of partitions without necessarily changing any of the client directory applications.

It should be noted that where the terms "server," "computer," or similar terms are used herein, a communication device is described that may be used in a communication system, unless the context otherwise requires, and should not be construed to limit the present disclosure to any particular communication device type. Thus, a communication device may include, without limitation, a bridge, router, bridge-router (router), switch, node, or other communication device, which may or may not be secure.

It should also be noted that where a flowchart is used herein to demonstrate various aspects of the present disclosure, it should not be construed to limit the present disclosure to any particular logic flow or logic implementation. The described logic may be partitioned into different logic blocks (e.g., programs, modules, functions, or subroutines) without changing the overall results or otherwise departing from the true scope of the present disclosure. Often, logic elements may be added, modified, omitted, performed in a different order, or implemented using different logic constructs (e.g., logic gates, looping primitives, conditional logic, and other logic constructs) of the present disclosure.

Various embodiments may be implemented in many different forms, including computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a particular embodiment, predominantly all of the communication between users and the server is implemented as a set of computer program instructions that is converted into a computer executable form, stored as such in a computer readable medium, and executed by a microprocessor under the control of an operating system.

Computer program logic implementing all or part of the functionality where described herein may be embodied in various forms, including a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM or DVD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and inter-networking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including, for example, programmable logic for use with a programmable logic device) implementing all or part of the functionality where described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM or DVD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method of searching and updating a directory information system, the method comprising:
   receiving, by a directory server, a request from a client to perform an operation on a base object within the directory information system, the directory information system comprising a plurality of objects distributed among a plurality of partitions, each partition of the plurality of partitions subordinate to a parent node of the plurality of parent nodes, the request comprising a label identifying the name of the base object with the partitions being invisible to the client and at least one or more one or more attribute values of the base object selected from the group consisting of:
  a globally unique identifier;
  an identifier unique with respect to a plurality of sibling directory objects of the plurality of directory objects, the plurality of sibling directory objects having a parent in common; and
  an email address;
applying, by the directory server, a mathematical operation to the name of the base object to result in a positive integer outcome;
determining, by the directory server, that a first partition of the plurality of partitions is associated with the positive integer outcome calculated, at least in part, by applying the mathematical operation to the name of the base object; and
routing, by the directory server, the operation to the first partition without client interaction.

2. The method of claim 1, wherein the mathematical operation performed on at least one of the one or more characteristics of the object comprises a hash function.

3. The method of claim 1, wherein the mathematical operation performed on at least one of the one or more characteristics of the object comprises an equation function (characteristic) modulus N=result, and wherein
  the function is a first mathematical operation producing a positive integer outcome;
  the characteristic is at least one of the one or more characteristics of the object;
  the N is a total number of the plurality of partitions; and
  the result is a value assigned to one or more of the plurality of partitions.

4. A method as claimed in claim 3, wherein the first mathematical operation comprises one or more functions selected from the list consisting of:
  a checksum;
  a cryptographic hash;
  a numeric sum; and
  a hash table.

5. The method of claim 3, wherein the first mathematical operation comprises a non-linear function.

6. The method of claim 1, wherein the plurality of objects comprises a first object and a second object, the first object of the plurality of objects subordinate to the second object of the plurality of objects.

7. The method of claim 1, further comprising searching at least a subset of the plurality of partitions for the base object.

8. A directory information system comprising:
  one or more servers comprising computer-readable media divided into a plurality of partitions, each partition subordinate to a first parent node of a plurality of parent nodes; and
  a plurality of objects stored in the computer-readable media of the one or more servers, each object arranged in a respective partition of the plurality of partitions in accordance with a respective positive integer result of a mathematical operation applied to one or more characteristics of the object, the positive integer result identifying the respective partition of the plurality of partitions, and
  wherein the one or more servers are operable to:
    receive a request for an operation to be performed on a base object within the plurality of objects, the request identifying the name of the base object with the partitions being invisible to the client and at least one or more one or more attribute values of the base object selected from the group consisting of:
      a globally unique identifier;
      an identifier unique with respect to a plurality of sibling directory objects of the plurality of directory objects, the plurality of sibling directory objects having a parent in common; and
      an email address;
    apply a mathematical operation to the name of the base object to result in a positive integer outcome;
    determine that a first partition of the plurality of partitions is associated with the positive integer outcome calculated, at least in part, by applying the mathematical operation to the name of the base object;
    route the operation to the first partition without client interaction.

9. The directory information system of claim 8, wherein a first object of the plurality of objects is arranged, in the respective partition, subordinate to a second object of the plurality of objects.

10. The directory information system of claim 8, wherein the mathematical operation comprises a hash function.

11. The directory information system of claim 8, wherein the mathematical operation comprises a non-linear function.

12. The directory information system of claim 8, wherein the mathematical operation applied to the one or more characteristics of the object, comprises an equation function (characteristic) modulus N=result, and wherein
  the function is a first mathematical operation producing a positive integer outcome;
  the characteristic is at least one of the one or more characteristics of the object;
  the N is a total number of the plurality of partitions; and
  the result is a value assigned to one or more of the plurality of partitions.

13. The directory information system of claim 8, wherein at least two objects of the plurality of objects are distributed within a first partition of the plurality of partitions based at least in part on at least two of the respective results generated by the first mathematical operation, the at least two of the respective results substantially the same.

14. The directory information system of claim 8, further comprising logic embodied in a computer-readable medium and operable, when executed, to:
  determine a name of a first object of the plurality of objects;
  determine a first partition of the one or more partitions contains the first object, at least in part, by applying the mathematical operation to at least one of the one or more characteristics of the first object; and
  route the operation to a first server of the one or more servers, the first server operable to manage the first partition.

15. The directory information system of claim 8, further comprising logic embodied in computer-readable medium and operable, when executed, to search at least a subset of the one or more partitions for a first object of the plurality of objects.

16. The directory information system of claim 8, further comprising logic embodied in computer-readable medium and operable, when executed, to:
  determine a first partition of the plurality of partitions;

determine a second partition of the plurality of partitions shares the same parent node of the one or more parent nodes with the first partition of the plurality of partitions; and search the second partition of the plurality of partitions for a first object of the plurality of objects.

\* \* \* \* \*